John M. Rosebrooks.
Improvement in Harvesters and Rakes therefor.
No. 120,777.  Patented Nov. 7, 1871.
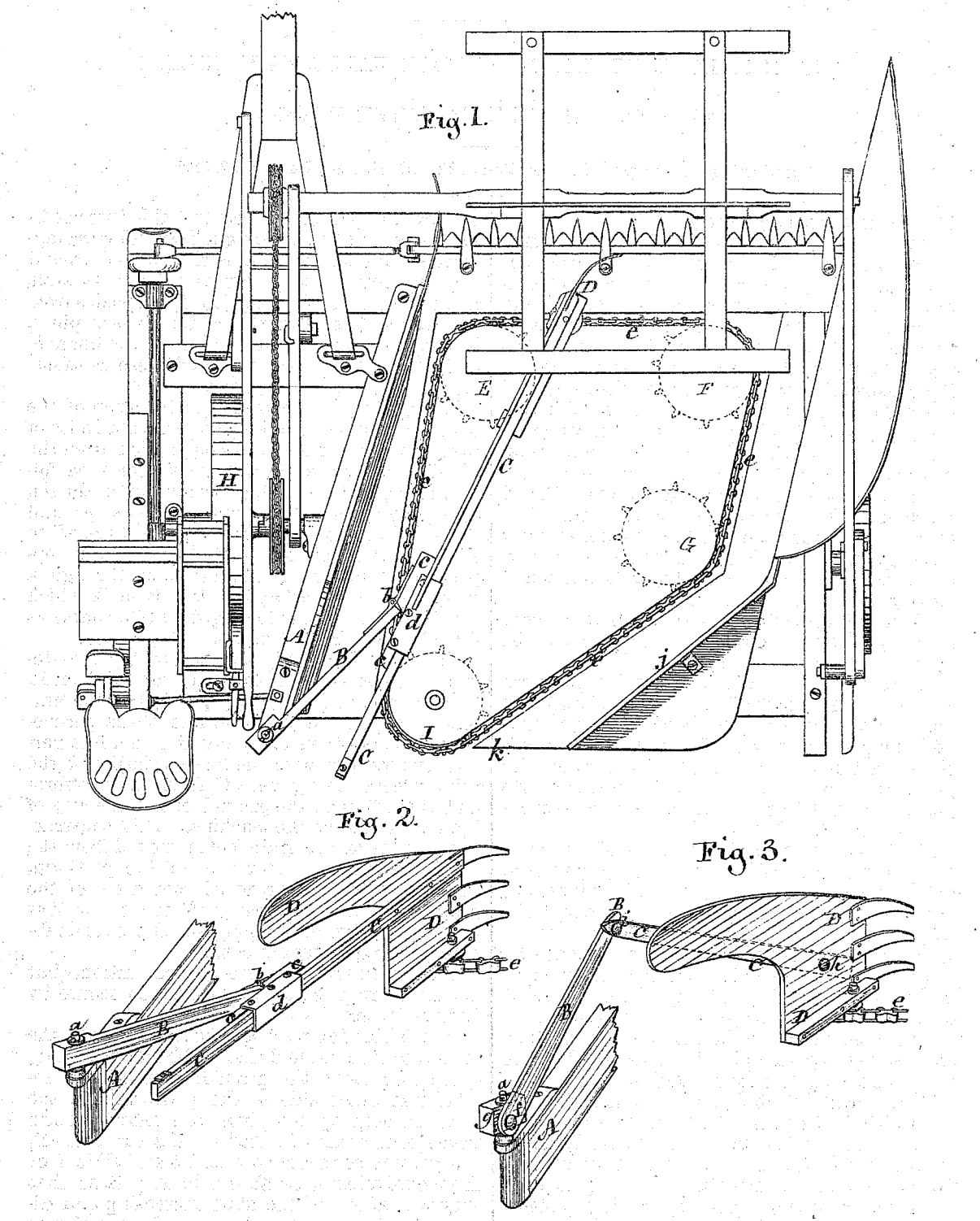

UNITED STATES PATENT OFFICE.

JOHN M. ROSEBROOKS, OF HOOSICK FALLS, NEW YORK.

IMPROVEMENT IN HARVESTER-RAKES.

Specification forming part of Letters Patent No. 120,777, dated November 7, 1871.

*To all whom it may concern:*

Be it known that I, JOHN M. ROSEBROOKS, of Hoosick Falls, in the county of Rensselaer and State of New York, have invented certain new and useful Improvements in Harvesting-Machines and the Application of Sweep-Rakes thereto; and I do hereby declare the following to be a full, clear, and exact description of the construction and operation of the same, reference being had to the accompanying drawing making a part of this specification, in which—

Figure 1 represents a top plan of a harvesting-machine with the rake and its driving mechanism represented as applied thereto. Fig. 2 represents, in perspective, the rake and its stale as detached from the machine to better show their construction. Fig. 3 represents, in perspective, a modification of the rake-stale and its connection with the rake.

Similar letters of reference where they occur in the separate figures denote like parts of the apparatus in the drawing.

A rake moving over or around a platform by a chain, substantially as herein shown, has been heretofore used; but such rake was pivoted, hinged, or hung on the rear inside or outside corner of the platform, so that it swept the grain from the outside toward the inside of the platform and delivered it at or near the rear inside corner thereof.

My invention consists in hinging the rake-stale to the rear inside corner of the platform, and combining with it two pivotal connections and a slide, or their equivalents, to adapt the rake to sweeping the grain from the inner toward the outer side of the platform; thence, by the aid of a guide-board or fence, toward the rear inner corner of said platform, where it is delivered in the usual place of delivering gavels.

To enable others skilled in the art to make and use my invention, I will proceed to describe the same with reference to the drawing.

To the frame-piece A, or to a post or support of any kind at or near the point $a$, is pivoted a rake-stale, B, which, as shown in Fig. 2, moves around the center $a$ horizontally or nearly so. To the end of this rake-stale B is hinged, as at $b$, a block, $c$, having upon it a guiding-plate or piece $d$, through which a second stale, arm, or handle, $c$, can slide, as the rake D, to which it is fastened, is carried around by the chain or belt $e$, which passes over the chain-wheels I E F G, the former of which is the driver, which receives its motion from the main drive-wheel H through proper and controllable intermediate gears, and the others guiding and carrying-wheels. As this rake D, as it is carried around by the chain $e$, must, of course, have its stale lengthened and shortened just as it recedes from or approaches toward the center pivot or pin $a$, it is furnished first with the pivot $a$, the hinge $b$, and the slide $d$, which admit of these motions, extensions, and contractions.

In Fig. 3 there is shown a modification of the construction of the rake-stale, which admits of precisely the same traversing motion from the pivot or point $a$ as in the other figures, as follows: The stale B, besides turning upon the pin $a$, is pivoted at $f$ to a turning-block, $g$; and the stale $c$, instead of being rigidly fastened to the rake D, is pivoted thereto at $h$; and its opposite end, instead of sliding in or through a guide, is pivoted, as at $i$, to the stale B, which admits of the rake following the same course as that shown in Figs. 1 and 2.

The rake from the rake-wheel I moves toward the front of the platform; thence from E, to and around F, it moves parallel to the cutters; thence from F in the line of the perimeter of G; and then obliquely, but in a line parallel or nearly so with the fence $j$, until at $k$ the rake sweeps the gavel off from the platform and drops it upon the ground out of the way of the next round of the machine. This construction admits of the grain being moved from the inner toward the outer side of the platform, and thence to the rear, which movement of the grain will catch and carry off any straw that may be clinging or hanging on the outside divider, as frequently happens.

Having thus fully described my invention, what I claim therein as new, and desire to secure by Letters Patent, is—

In combination with a rake and its stale, the former carried around the platform by a chain, $e$, so as to move the grain from the inner toward the outer side of the platform, and the latter turning upon a pivot at $a$ near the main frame and almost in rear of the drive-wheel, the pivotal connections $a$ and $b$ and slide $d$ or their equivalents, as shown in Fig. 3, so that they will admit of the stale increasing and diminishing its operative length, substantially as described.

JOHN M. ROSEBROOKS.

Witnesses:
A. C. EDDY,
J. RUSSELL PARSONS. (74)